United States Patent
Kim et al.

(10) Patent No.: US 9,830,031 B2
(45) Date of Patent: Nov. 28, 2017

(54) TOUCH SCREEN PANEL AND MANUFACTURING METHOD THEREOF

(71) Applicant: Samsung Display Co., Ltd., Yongin (KR)

(72) Inventors: Jae Neung Kim, Seoul (KR); Jong Hyun Choi, Seoul (KR); Jeong-Hwan Kim, Cheonan-si (KR); Won Baek Lee, Yongin-si (KR); Ki-Hyun Cho, Suwon-si (KR); Kyung Seop Kim, Hwaseong-si (KR); Cheol Kyu Kim, Seoul (KR); Sung Kyun Park, Suwon-si (KR); Sun Haeng Cho, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 227 days.

(21) Appl. No.: 14/806,864

(22) Filed: Jul. 23, 2015

(65) Prior Publication Data

US 2016/0224170 A1    Aug. 4, 2016

(30) Foreign Application Priority Data

Feb. 4, 2015    (KR) .......................... 10-2015-0017379

(51) Int. Cl.
*G06F 3/044* (2006.01)

(52) U.S. Cl.
CPC .... *G06F 3/044* (2013.01); *G06F 2203/04103* (2013.01)

(58) Field of Classification Search
CPC ... H05K 2201/0347; H05K 2201/0352; H05K 2201/0335; H01R 12/722; G06F 2203/04103; G06F 3/044
See application file for complete search history.

(56) References Cited

U.S. PATENT DOCUMENTS

| 5,620,800 A | * | 4/1997 | De Leeuw | ........... C08G 61/126 156/150 |
| 2006/0097991 A1 | * | 5/2006 | Hotelling | .............. G06F 3/0416 345/173 |
| 2008/0237863 A1 | * | 10/2008 | Toyoda | ............. H01L 21/76834 257/751 |

(Continued)

FOREIGN PATENT DOCUMENTS

JP    2013-117816    6/2013
KR    10-0908102    7/2009

(Continued)

*Primary Examiner* — Kent Chang
*Assistant Examiner* — Nathan Brittingham
(74) *Attorney, Agent, or Firm* — H.C. Park & Associates, PLC

(57) ABSTRACT

A touch screen panel includes a substrate, touch electrodes disposed on a touch area of the substrate and configured to sense a touch, and a connection line disposed on the touch area, the connection line including a first end connected a touch electrode of the touch electrodes and a second end connected to a pad, the pad including a first conductive layer disposed on the substrate, a second conductive layer disposed on the first conductive layer, and a first protective conductive layer disposed on the second conductive layer, in which the touch electrode includes the first conductive layer and the first protective conductive layer.

13 Claims, 13 Drawing Sheets

(56) References Cited

U.S. PATENT DOCUMENTS

| | | | |
|---|---|---|---|
| 2011/0067933 A1* | 3/2011 | Chang | G06F 3/044 178/18.05 |
| 2012/0044160 A1* | 2/2012 | Lan | G06F 3/044 345/173 |
| 2013/0106780 A1* | 5/2013 | Hotelling | G06F 3/0416 345/174 |
| 2014/0028584 A1 | 1/2014 | Park et al. | |
| 2014/0139447 A1 | 5/2014 | Kang et al. | |
| 2014/0145977 A1 | 5/2014 | Kang | |
| 2014/0152910 A1 | 6/2014 | Kang et al. | |
| 2014/0299365 A1* | 10/2014 | Sebastian | G06F 3/044 174/255 |
| 2015/0287748 A1* | 10/2015 | Jin | H01L 27/124 257/306 |
| 2015/0287751 A1* | 10/2015 | Jin | H01L 27/124 438/23 |
| 2015/0313015 A1* | 10/2015 | Wada | H01L 23/49811 174/261 |
| 2016/0128183 A1* | 5/2016 | Matsumoto | H05K 1/0224 174/250 |
| 2016/0162086 A1* | 6/2016 | Yang | C23C 14/24 345/174 |
| 2016/0216827 A1* | 7/2016 | Lee | G06F 3/044 |
| 2016/0342056 A1* | 11/2016 | Long | G02F 1/133345 |
| 2017/0184897 A1* | 6/2017 | Rho | G02F 1/13338 |
| 2017/0192544 A9* | 7/2017 | Huang | G06F 3/041 |

FOREIGN PATENT DOCUMENTS

| | | |
|---|---|---|
| KR | 10-2012-0046055 | 5/2012 |
| KR | 10-2014-0011606 | 1/2014 |
| KR | 10-2014-0016070 | 2/2014 |
| KR | 10-2014-0064259 | 5/2014 |
| KR | 10-2014-0066441 | 6/2014 |
| KR | 10-2014-0070103 | 6/2014 |

* cited by examiner

FIG. 4
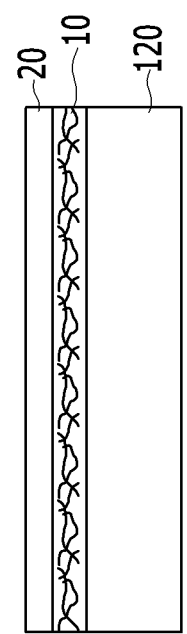
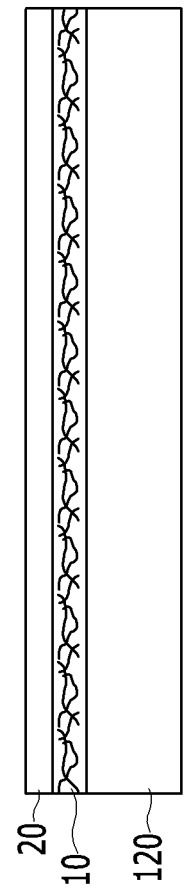

TOUCH SCREEN PANEL AND MANUFACTURING METHOD THEREOF

CROSS-REFERENCE TO RELATED APPLICATION

This application claims priority from and the benefit of Korean Patent Application No. 10-2015-0017379 filed on Feb. 4, 2015, which is hereby incorporated by reference for all purposes as if fully set forth herein.

BACKGROUND

Field

Exemplary embodiments of the present invention relate to a touch screen panel and a manufacturing method thereof.

Discussion of the Background

Display devices such as a liquid crystal display (LCD), an organic light emitting diode (OLED), an electrophoretic display (EPD), and the like, portable transmitters, other information processing devices, and the like, may be operated by using various input devices. An input device including a touch sensing device has been recently used.

A touch sensing function may refer to detecting touch information, such as whether an object approaches or touches a screen and a touch location of the object, by sensing a change in pressure, charge, or light by the display device, which are applied to the screen when a user approaches or touches the screen with a finger or a touch pen to write a letter or draw an image on the screen. The display device may receive an image signal and display an image based on the touch information. The touch sensing function may be implemented by a touch sensor. The touch sensor may be classified into various touch sensing types, such as a resistive type, a capacitive type, an electromagnetic resonance (EMR) type, and an optical type.

The resistive type and the capacitive type have been generally used. In the resistive type touch sensor, two electrodes spaced apart and facing each other may be in contact with each other when pressure is applied by an external object. When the two electrodes are in contact with each other, the resistive type touch sensor may detect a contact position by recognizing a voltage change from a resistance change at the contact position.

The capacitive type touch sensor may include a sensing capacitor including sensing electrodes that may transmit a sensing signal and sense a change in capacitance of the sensing capacitor generated when a conductor, such as the finger, approaches the sensor so as to detect whether or not the conductor touches the sensor, the touch location thereof, and the like. In the capacitive type touch sensor, since the touch may be sensed when the user touches the touch screen, a touch from a conductive object may be required.

A flexible electronic device may include the touch screen. To provide flexible characteristics of the flexible electronic device, the electrodes of the touch screen may have flexibility to prevent generating a defect. As materials of the electrodes having flexibility, various materials such as metal nanowire, such as silver nanowire (AgNW), a carbon nanotube (CNT), graphene, metal mesh, and a conductive polymer have been developed. However, since these materials have low conductivity, a separate pad including a low resistance metal, such as copper, may be required to supplement conductivity for the pad of the touch screen.

When the pad to which an external signal is applied is exposed, the pad may be easily oxidized and corroded, and the oxidation and corrosion may spread into the touch screen, which may degrade reliability of the touch screen.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a touch screen panel and a manufacturing method thereof that may prevent corrosion of a pad, which may include a low resistance metal.

Additional aspects will be set forth in the detailed description which follows, and, in part, will be apparent from the disclosure, or may be learned by practice of the inventive concept.

According to an exemplary embodiment of the present invention, a touch screen panel includes a substrate, touch electrodes disposed on a touch area of the substrate and configured to sense a touch, and a connection line disposed on the touch area, the connection line including a first end connected a touch electrode of the touch electrodes and a second end connected to a pad, the pad including a first conductive layer disposed on the substrate, a second conductive layer disposed on the first conductive layer, and a first protective conductive layer disposed on the second conductive layer, in which touch electrode includes the first conductive layer, and the first protective conductive layer.

The first protective conductive layer may include a second protective conductive layer disposed on the first protective conductive layer.

The first protective conductive layer may have substantially the same width as the second conductive layer.

The second protective conductive layer may cover a top surface of the first protective conductive layer and a side surface of the second conductive layer.

The second protective conductive layer may contact a portion of top surface of the first conductive layer not overlapping the second conductive layer.

The first and second protective conductive layers may include conductive material.

The first conductive layer may include a metal nanowire.

The first conductive layer may further include a polymer resin film.

The second conductive layer may include at least one of copper (Cu), titanium (Ti), aluminum (Al), molybdenum (MO), and transparent conductive oxide (TCO).

The touch screen panel may further include a passivation layer disposed on the substrate, the passivation layer may include an opening part exposing the pad.

The passivation layer may include silicon nitride (SiNx).

The touch electrode may include a first electrode disposed on the substrate, the first electrode including a metal nanowire, and a second electrode disposed on the first electrode, the second electrode including a transparent conductive material.

The touch electrodes may be disposed in rows and columns, and a first touch electrode of the touch electrodes disposed in a first distance from the pad may include a first size, and a second touch electrode of the touch electrodes disposed in a second distance from the pad less than the first distance may include a second size smaller than the first size.

According to an exemplary embodiment of the present invention, a method of manufacturing a touch screen panel includes preparing a substrate, forming a first conductive film on the substrate, the first substrate including a flexible conductor, forming a second conductive film on the first conductive film, forming a second conductive layer by etching the second conductive film, forming a third conductive film on the second conductive layer and the first conductive film, and forming a first conductive layer and a first protective conductive layer by etching the first conductive film and the third conductive film at a time.

The first conductive film and the third conductive film may be etched simultaneously to form the first conductive layer and the first protective conductive.

According to an exemplary embodiment of the present invention, a method of manufacturing a touch screen panel includes preparing a substrate, forming a first conductive film on the substrate, the first conductive film including a flexible conductor, forming a second conductive film on the first conductive film, forming a third conductive film on the second conductive film, forming a second conductive layer and a first protective conductive layer by etching the second conductive film and the third conductive film simultaneously, forming a fourth conductive film on the first protective conductive layer and the first conductive film, and forming a first conductive layer and a second protective conductive layer by etching the fourth conductive film and the first conductive film simultaneously.

The method may further include forming a passivation layer including silicon nitride (SiNx) after forming the first conductive layer and the second protective conductive layer.

Forming the passivation layer may include forming an opening part by etching the passivation layer.

The size of the first conductive layer and the first protective conductive layer forming a touch electrode may be formed to be smaller as a distance between the touch electrode and a pad comprising the second conductive layer decreases According to exemplary embodiments of the present invention, the touch screen panel and the manufacturing method thereof may prevent corrosion of a pad including low resistance metal.

According to exemplary embodiments of the present invention, the number of masks used in the manufacturing process of the touch screen panel may be decreased, the manufacturing process may be shortened, and production costs of the touch screen panel may be reduced.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 4, FIG. 5, FIG. 6, and FIG. 7 are partial cross-sectional views and a plan view of a manufacturing process of a touch sensor according to an exemplary embodiment of the present invention.

DETAILED DESCRIPTION OF THE ILLUSTRATED EMBODIMENTS

Figure 1:
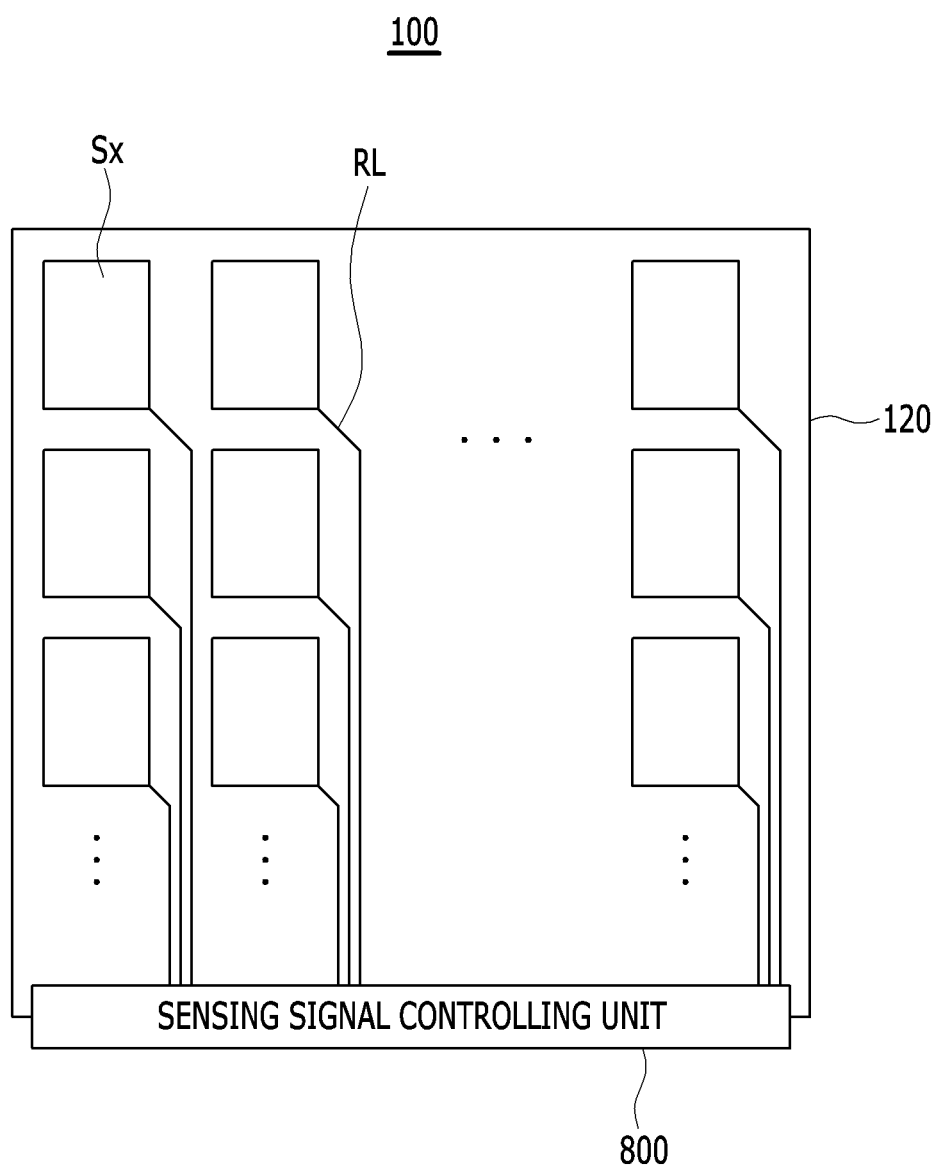
FIG. 1 is a plan view of a touch panel according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a schematic plan view of a touch panel according to an exemplary embodiment of the present invention.

Referring to FIG. 1, a touch panel 100 according to the present exemplary embodiment includes a touch sensor formed on a substrate 120 and a sensing signal controlling unit 800 connected to the touch sensor. The touch sensor according to the present exemplary embodiment may sense a touch of an external object and may be a capacitive type.

The touch sensor may be disposed in a display panel or a separate touch panel to sense the touch. Hereinafter, exemplary embodiments of the present invention will describe the touch panel 100 as to include the touch sensor. The touch may refer to when the external object approaches the display panel or the touch panel 100, or when the external object directly contacts the display panel or the touch panel 100.

The touch sensor according to the present exemplary embodiment includes touch electrodes Sx disposed on an active area and connection lines RL connected to the touch electrodes Sx. The active area may be an area to which the touch may be applied and from which the touch may be sensed. In a display panel, the active area may overlap a display area on which an image is displayed. In the touch panel 100, the active area may be a touch area. When the touch panel 100 is embedded in the display panel, the touch area may overlap the display area. Hereinafter, the active area may also be referred as the touch area.

The touch electrodes Sx may be arranged in rows and columns form and formed on the same layer as each other in a cross-sectional structure. The touch electrode Sx may include transparent conductive materials such as indium tin oxide (ITO) and indium zinc oxide (IZO), and metal nanowire such as silver nanowire (AgNW). The touch electrode Sx may have a quadrangular shape. Alternatively, the touch electrode Sx may have various shapes.

The touch electrode Sx may include protrusions and depressions (not shown) formed at edge sides thereof to increase touch sensitivity. When the edge side of the touch electrode Sx includes the protrusions and depressions, adjacent edge sides of the touch electrodes Sx including protrusion and depression may be engaged with each other. A length of one side of the touch electrode Sx may be approximately several mm, for example, approximately 10 mm or less. More particularly, a length of one side of the touch electrode Sx may be approximately 4 mm to 5 mm, but a size of the touch electrode Sx may be varied depending on touch sensing resolution.

The touch electrodes Sx may be separated from each other in the touch area. Each of the touch electrodes Sx may be connected to the sensing signal controlling unit 800 through the connection lines RL, respectively. The touch electrodes Sx according to the present exemplary embodiment may receive a sensing input signal from the sensing signal controlling unit 800 through the respective connection lines RL, and generate a sensing output signal according to the touch so as to be transmitted to the sensing signal controlling unit 800.

Each touch electrode Sx may form a self sensing capacitor, so as to be charged with a predetermined charge amount after receiving the sensing input signal. Thereafter, when the external object such as a finger touches the touch panel, the charged amount of the self sensing capacitor may be changed, such that the touch electrode Sx may output a sensing output signal different from the received sensing input signal. The touch electrode Sx may detect touch information, such as whether or not the object touches the touch panel and a touch position, through the generated sensing output signal.

The connection lines RL connect the touch electrodes Sx and the sensing signal controlling unit 800, so as to transmit the sensing input signal or the sensing output signal. The connection line RL may be disposed on the same layer as the touch electrode Sx and may include the same material as the touch electrode Sx. Alternatively, the connection line RL may be disposed on a layer different from the touch electrode Sx and connected to the touch electrode Sx through a separate connection part.

According to the present exemplary embodiment illustrated with reference to FIG. 1, more connection lines RL may be disposed between columns of the touch electrodes Sx, as a column is disposed closer to the sensing signal controlling unit 800. Accordingly, the size of the touch electrode Sx may be smaller as the touch electrode is closer to the sensing signal controlling unit 800. A width of the connection line RL may be in a range of 10 µm to 100 µm.

A connection portion between the touch electrode Sx and the connection line RL may form a bottleneck portion of which a width is sharply increased or decreased. The sensing signal controlling unit 800 is connected to the touch electrodes Sx of the touch panel 100 so as to transmit the sensing input signal to the touch electrodes Sx and receive the sensing output signal from the touch electrodes Sx. The sensing signal controlling unit 800 may generate the touch information such as whether or not the object touches the touch panel and the touch position by processing the sensing output signal. Alternatively, the sensing signal controlling unit 800 may also be disposed on a printed circuit board independent of the touch panel 100 so as to be connected to the touch panel 100, be attached onto the touch panel 100 in a form of integrated circuit chip or a tape carrier package (TCP) form, and be integrated on the touch panel 100.

Hereinafter, an interlayer configuration of the touch sensor according to an exemplary embodiment of the present invention will be described in more detail.

Figure 2:
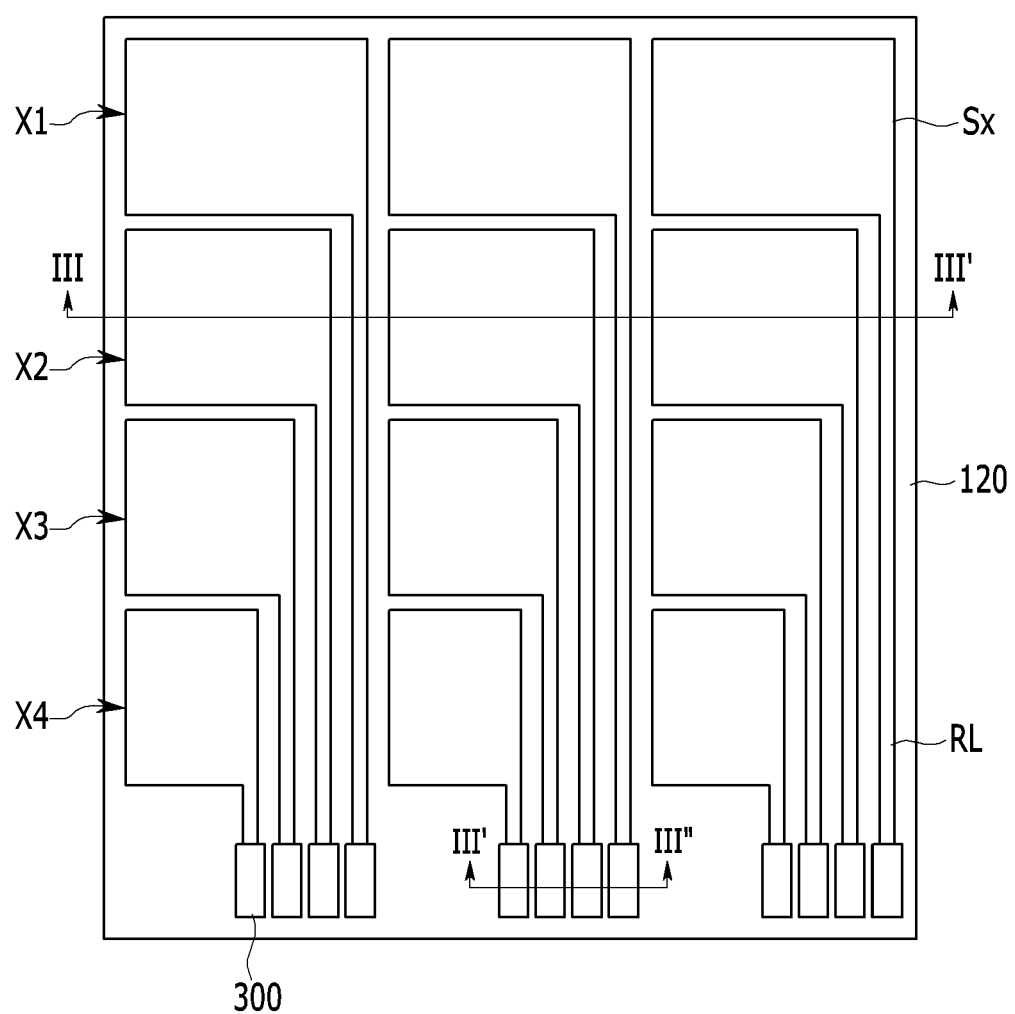
FIG. 2 is a layout view of the touch sensor of FIG. 1.
Figure 3:
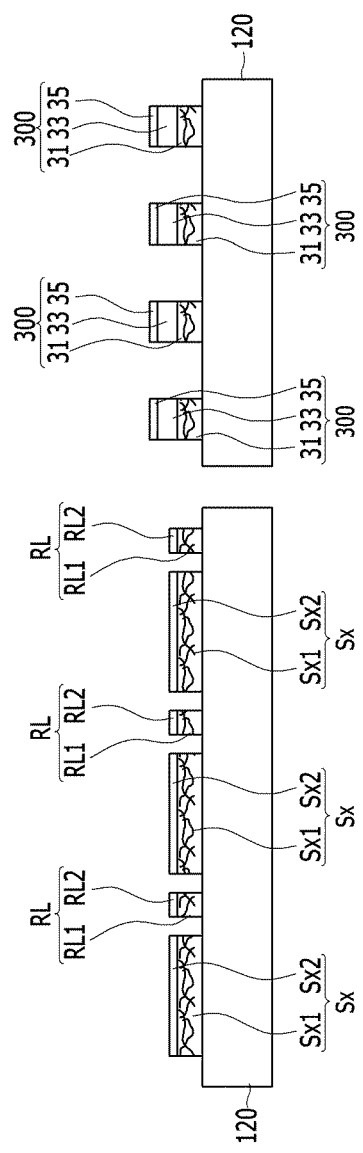
FIG. 3 is a cross-sectional view taken along line III-III' and line III'-III" of FIG. 2.

FIG. 2 is a layout view of the touch sensor of FIG. 1. FIG. 3 is a cross-sectional view taken along line III-III' and line III'-III" of FIG. 2.

Referring to FIG. 2, a touch panel 100 according to the present exemplary embodiment includes a substrate 120 and touch electrodes Sx disposed in rows and columns on the substrate 120. The touch electrodes Sx are disposed in one direction and include a predetermined interval therebetween. The touch electrodes Sx may be connected to a pad 300 through the connection lines RL, respectively.

The connection lines RL may input an input signal to the touch electrodes Sx or output an output signal to the sensing signal controlling unit 800 through the pad 300. A substantial portion of the connection lines RL is disposed in a touch area TA in which the touch electrodes Sx are formed, and each of the connection lines RL is connected to the pad 300 disposed in a peripheral area PA surrounding the touch area TA. More particularly, the connection line RL is connected to one side of the touch electrode Sx facing the pad 300 and is disposed between two touch electrodes Sx adjacent to each other in a row direction. As the connection line RL is disposed between the touch electrodes Sx, a width of the peripheral area PA that does not include the pad 300 may be decreased.

An area of the touch electrode Sx may be decreased as the touch electrode Sx is disposed closer to the pad 300. The decreased width of the touch electrode Sx may correspond to the width of the connection lines RL disposed adjacent to the touch electrode Sx, as the connection line RL is connected to the pad 300 in a straight line without being curved from one side of the touch electrode Sx. Therefore, a touch electrode Sx of a first row X1 disposed farthest from the pad 300 has the widest area, and a touch electrode Sx of a fourth row X4 disposed closest to the pad 300 has the smallest area, as all connection lines RL connected to the touch electrodes Sx of the first row X1, a second row X2, and a third row X3 pass between the touch electrodes Sx disposed in the fourth row X4. The touch electrodes Sx illustrated in FIG. 1 have three columns and four rows, but the number of rows and columns may vary.

The touch electrode Sx according to the present exemplary embodiment receives the sensing input signal through the connection line RL and is then charged with a predetermined charge amount. Thereafter, when the external object such as a finger touches the touch panel, the charged amount in the self sensing capacitor may be changed, such that a sensing output signal different from the received sensing input signal may be output. The touch information such as whether or not the object touches the touch panel and a touch position may be detected through a change in the sensing output signal.

Referring to FIG. 3, the substrate 120 of the touch panel 100 according to the present exemplary embodiment may include plastic or glass such as polycarbonate, polyimide, or polyether sulfone.

The substrate 120 may be a transparent flexible substrate that has elasticity, and may be foldable, bendable, rollable, and stretchable in at least one direction, and the like. The touch electrodes Sx and pads 300, which are each connected to the touch electrodes Sx by the connection lines RL, are formed on the substrate 120.

The touch electrode Sx includes a first electrode Sx1 and a second electrode Sx2 disposed on the first electrode Sx1, and the connection line RL includes a first line RL1 and a second line RL2. The first electrode Sx1 and the first line RL1 may include metal nanowire. The metal nanowire may include metal wire such as silver (Ag) and copper (Cu). The metal nanowires are connected to each other in a mesh shape, thereby forming a conductive electrode. The metal nanowire may be formed by a solution process such as a slit coating process, an inkjet printing process, or a spray process.

The first electrode Sx1 and the first line RL1 may further include a polymer resin that may protect and fix the metal nanowire. The polymer resin may include an acrylate based organic material such as acryl polyester resin. The polymer resin may be mixed with the metal nanowire before the metal nanowire is applied, or the polymer resin may be applied on the metal nanowire layer. The polymer resin may fill a space between the metal nanowires and improve adhesion between the metal nanowire and the substrate 120.

The first electrode Sx1 and the first line RL1 may have high transmittance and surface resistance characteristics lower than a predetermined reference, thereby having high conductivity. The first electrode Sx1 and the first line RL1 may be more flexible than other metal thin films.

The second electrode Sx2 and the second line RL2 may be layers disposed on the pad 300 to protect the pad 300. The second electrode Sx2 and the second line RL2 have transmittance of a predetermined level and include a transparent conductive material which may be dry-etched. For example, the second electrode Sx2 and the second line RL2 may include indium tin oxide (ITO) and have transmittance of about 85% or more for a visible light region. The first and second electrodes Sx1 and Sx2 have the same plane shape, and the first and second lines RL1 and RL2 have the same plane shape.

The pad 300 includes a first conductive layer 31, a second conductive layer 33, and a first protective conductive layer 35, which are sequentially stacked. The first conductive layer 31, the second conductive layer 33, and the first protective conductive layer 35 have the same plane shape. The second conductive layer 33 may have the same width as or smaller width than that of the first protective conductive layer 35. A boundary line of the second conductive layer 33 may be disposed in a boundary line of the first protective conductive layer 35. More particularly, the first protective conductive layer 35 may cover the entire second conductive layer 33.

The first conductive layer 31 may include the same material as the first electrode Sx1 and the first line RL1, such as the metal nanowire. The second conductive layer 33 may include a low resistance metal, such as copper. The first protective conductive layer 35 may include the same material as the second electrode Sx2 and the second line RL2, and include a conductive material including, such as ITO, IZO, or the like.

Hereinafter, a manufacturing process of a touch sensor according to an exemplary embodiment of the present invention will be described.

Figure 5:
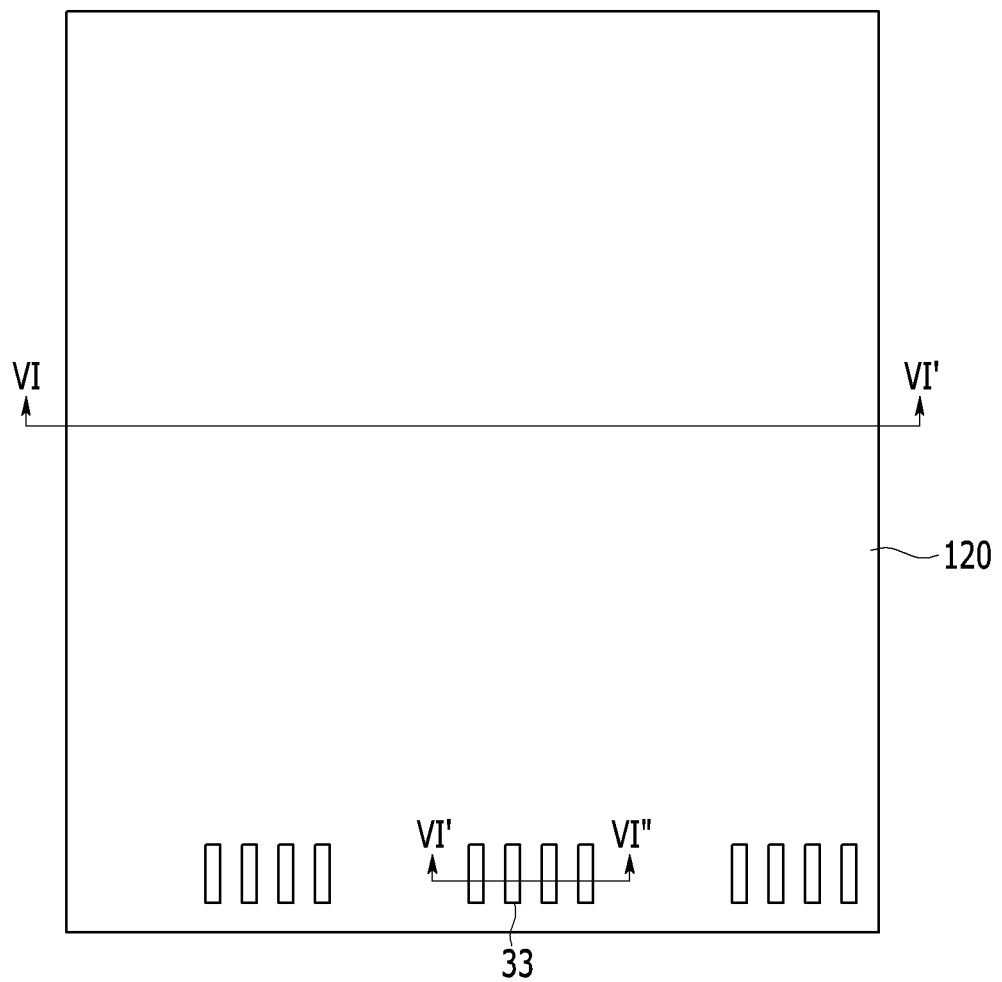
Figure 6:
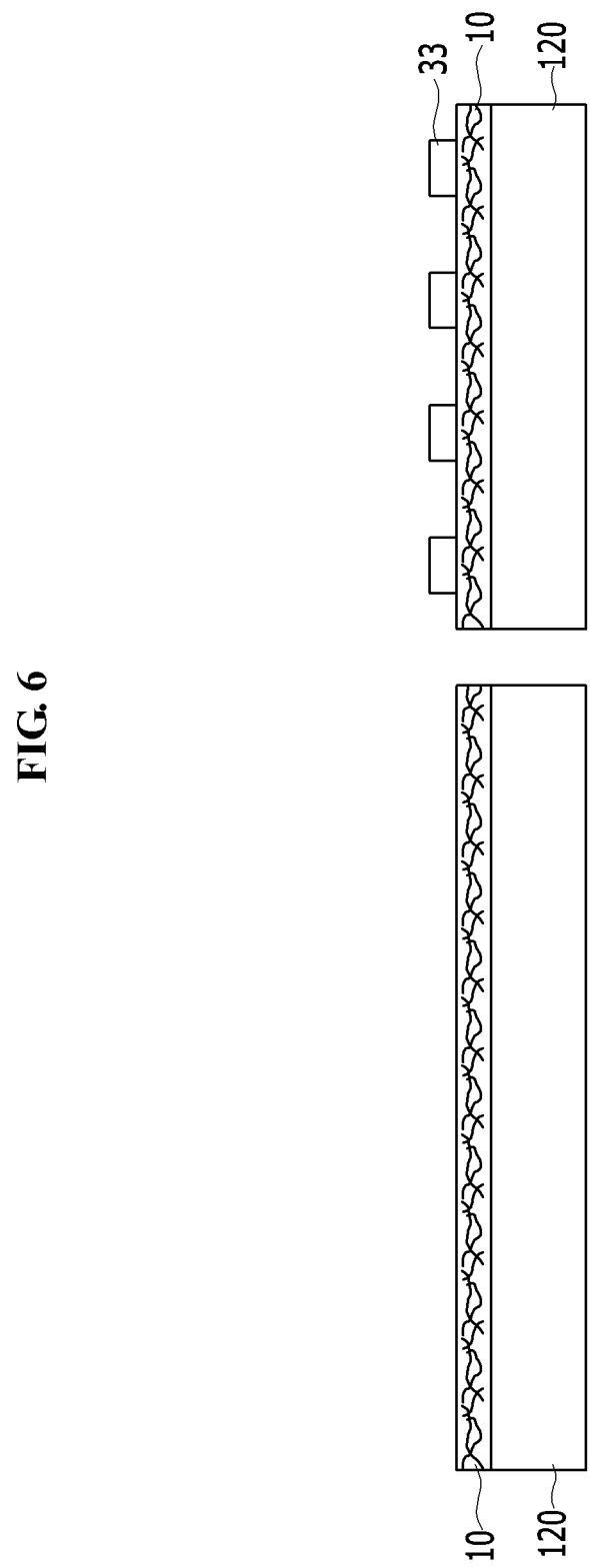
Figure 7:
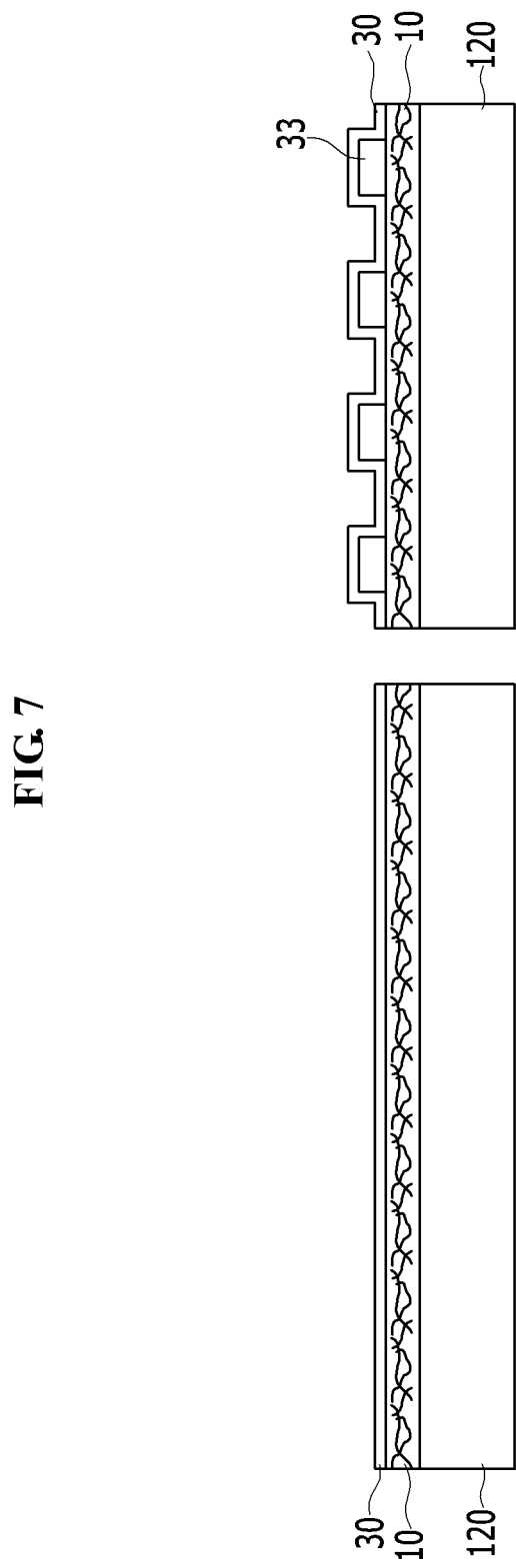

FIGS. 4 to 7 are partial cross-sectional views and a plan view of a manufacturing process of a touch sensor according to an exemplary embodiment of the present invention. More particularly, FIG. 4 is a cross-sectional view of a first operation illustrating a manufacturing method of a touch sensor according to an exemplary embodiment of the present invention, FIG. 5 is a layout view illustrating a manufacturing method of a touch screen panel following the operation illustrated with reference to FIG. 4. FIG. 6 is a cross-sectional view taken along line VI-VI' and line VI'-VI" of FIG. 5, and FIG. 7 is a cross-sectional view of a touch sensor following the operation illustrated with reference to FIG. 6.

Referring to FIG. 4, a first conductive film 10 and a second conductive film 20 are formed on a substrate 120. The first conductive film 10 may include silver nanowire, and the silver nanowire may be applied together with a polymer resin by a solution process. Alternatively, the first conductive film 10 may be formed of dry film resist including the silver nanowire.

The second conductive film 20 is formed by depositing copper. Alternatively, the second conductive film 20 may include at least of aluminum (Al), molybdenum (Mo), titanium (Ti), and transparent conductive oxide (TCO).

Next, referring to FIGS. 5 and 6, a second conductive layer 33 is formed by etching the second conductive film 20 using a photolithography process, or the like.

Next, referring to FIG. 7, a third conductive film 30 is formed on the second conductive layer 33 and the first conductive film 10. The third conductive film 30 may include a conductive material, such as ITO.

Next, referring back to FIGS. 2 and 3, a touch electrode Sx including a second electrode Sx2 and a first electrode Sx1, a connection line RL including a second line RL2 and a first line RL1, and a pad 300 including a first protective conductive layer 35, a second conductive layer 33, and a first conductive layer 31 are formed by etching the third conductive film 30 and the first conductive film 10 using the photolithography process, or the like. The first conductive film 10 and the third conductive film 30 may be etched along a boundary of the second conductive layer 33, to have the same shape.

As such, by etching the first conductive film 10 and the third conductive film 30 together, the second electrode Sx2 and the first electrode Sx1 may have the same plane shape, and the second line RL2 and the first line RL1 may have the same line.

Hereinafter, a touch sensor according to an exemplary embodiment of the present invention will be described with reference to FIGS. 8 to 13.

Figure 8:
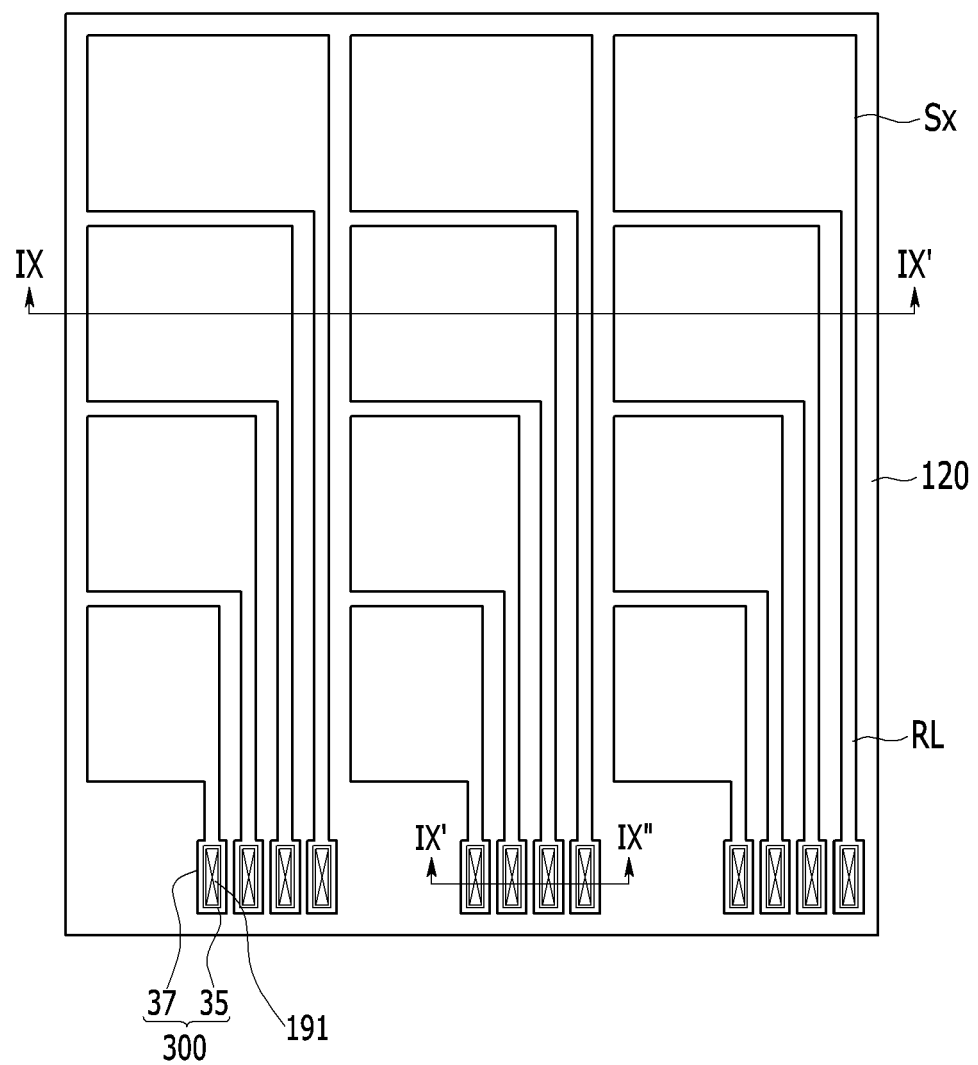
FIG. 8 is a layout view of the touch sensor of FIG. 1 according to an exemplary embodiment of the present invention.
Figure 9:
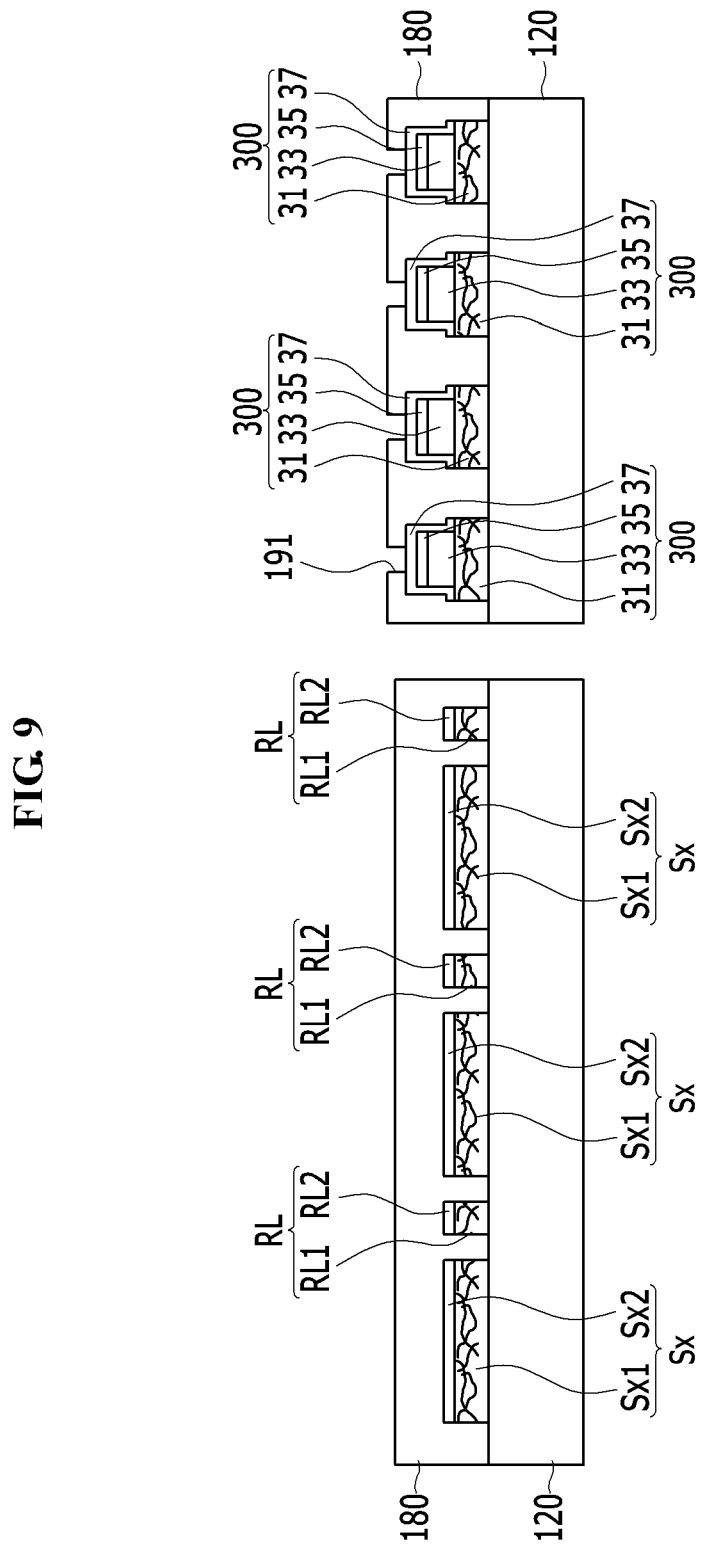
FIG. 9 is a cross-sectional view taken along line IX-IX' and IX'-IX" of FIG. 8.

FIG. 8 is a layout view of a touch sensor according to an exemplary embodiment of the present invention and FIG. 9 is a cross-sectional view taken along line IX-IX' and line IX'-IX" of FIG. 8.

Referring to FIGS. 8 and 9, a pad 300 of the touch sensor according to the present exemplary embodiment further includes a second protective conductive layer 37 on the first protective conductive layer 35, in addition to the elements of the touch sensor illustrated with reference to FIGS. 2 and 3. More particularly, the pad 300 of the touch sensor according to the present exemplary embodiment includes the first conductive layer 31, the second conductive layer 33, the first protective conductive layer 35, and the second protective conductive layer 37, which are sequentially stacked.

The first conductive layer 31 may have a width larger than that of the second conductive layer 33 and the first protective conductive layer 35. More particularly, the first conductive layer 31 is formed so as to have a width larger than that of the second conductive layer 33 and has the same plane shape as the second protective conductive layer 37.

The second conductive layer 33 may have the same width or a smaller width than that of the first protective conductive layer 35, and a boundary line of the second conductive layer 33 may be disposed in a boundary line of the first protective conductive layer 35. The second protective conductive layer 37 may contact a top surface and side surfaces of the first protective conductive layer 35, and side surfaces of the second conductive layer 33. Therefore, the second protective conductive layer 37 may cover the entire first protective conductive layer 35.

The first protective conductive layer 35 may cover the entire second conductive layer 33. The first conductive layer 31 may include the same material as the first electrode Sx1 and the first line RL1, such as metal nanowire. The second conductive layer 33 may include a low resistance metal, such as copper. The first protective conductive layer 35 and the second protective conductive layer 37 may include the same material as the second electrode Sx2 and the second line RL2, and may include a conductive material such as ITO, IZO, or the like. As such, the second conductive layer 33 is covered and protected using the first protective conductive layer 35 and the second protective conductive layer 37, thus preventing the second conductive layer 33 from being exposed and corroded.

Hereinafter, a manufacturing process of a touch sensor according to an exemplary embodiment of the present invention will be described.

Figure 10:
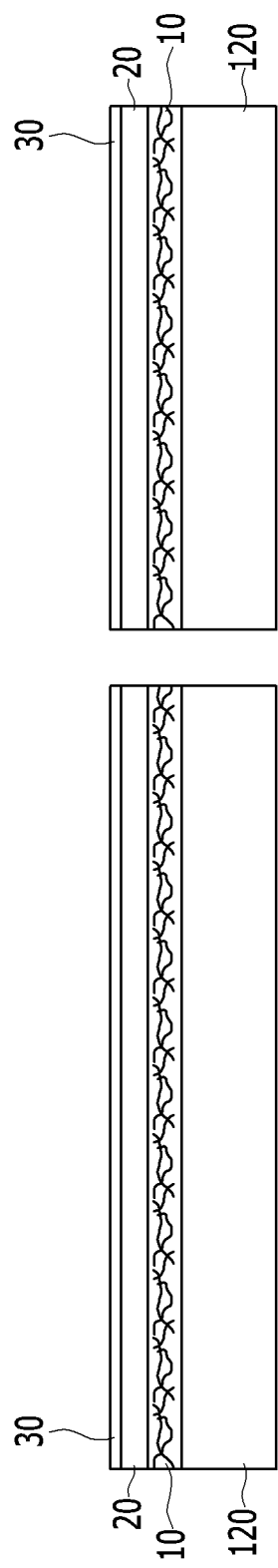
FIG. 10, FIG. 11, FIG. 12, and FIG. 13 are partial cross-sectional views and a plan view of a manufacturing process of a touch sensor according to an exemplary embodiment of the present invention.
Figure 11:
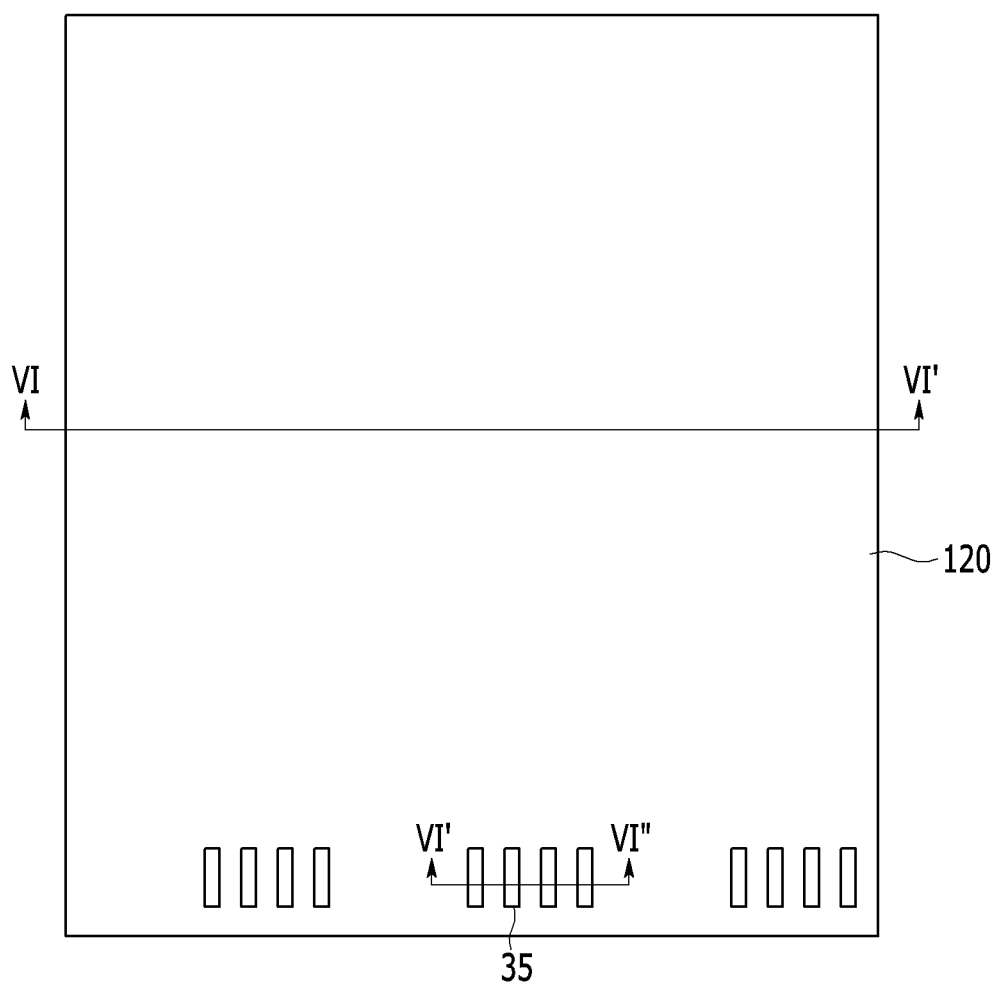
Figure 12:
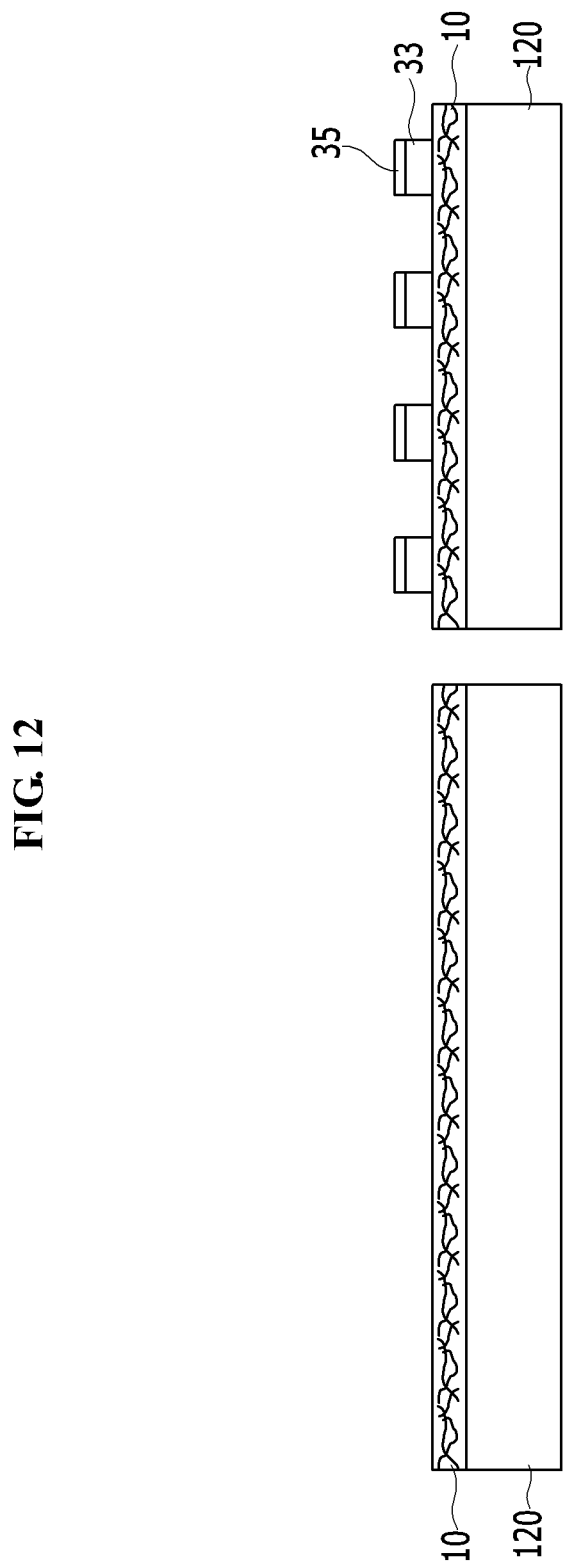
Figure 13:
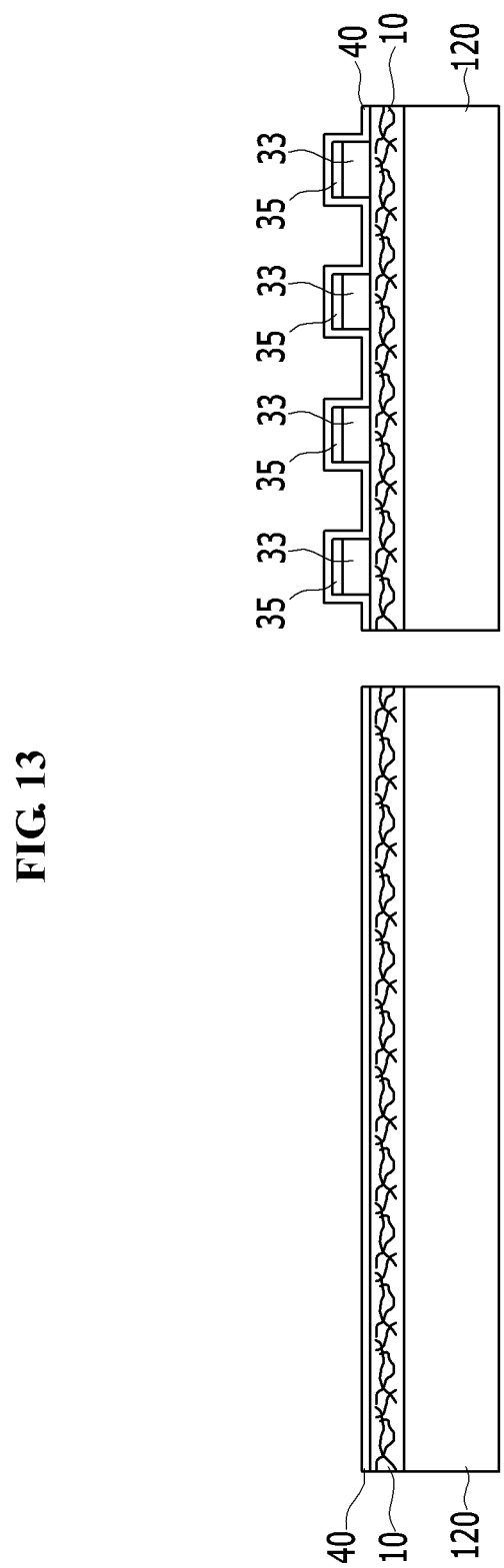

FIGS. 10 to 13 are partial cross-sectional views and a plan view of a manufacturing process of a touch sensor according to the exemplary embodiment. More particularly, FIG. 10 is a cross-sectional view of a first operation illustrating a manufacturing method of a touch sensor according to the present exemplary embodiment of the present invention, FIG. 11 is a layout view illustrating a manufacturing method of a touch screen panel following the operation illustrated with reference to FIG. 10, FIG. 12 is a cross-sectional view taken along line VI-VI' and line VI'-VI" of FIG. 11, and FIG. 13 is a cross-sectional view of the touch sensor following the operation illustrated with reference to FIG. 12.

Referring to FIG. 10, a first conductive film 10, a second conductive film 20, and a third conductive film 30 are formed on a substrate 120. The first conductive film 10 may include silver nanowire (AgNW), and the silver nanowire may be applied together with a polymer resin by a solution process. Alternatively, the first conductive film 10 may be formed of dry film resist (DFR) including the silver nanowire.

The second conductive film 20 is formed by depositing copper and the third conductive film 30 is formed by depositing a conductive material which may be etched simultaneously with the second conductive film 20. Alternatively the second conductive film 20 may include at least one material of aluminum (Al), molybdenum (Mo), and titanium (Ti).

Next, referring to FIGS. 11 and 12, a second conductive layer 33 including copper and a first protective conductive layer 35 protecting the second conductive layer 33 are each formed by etching the second conductive film 20 and the third conductive film 30 simultaneously using a photolithography process, or the like.

Next, referring to FIG. 13, a fourth conductive film 40 is formed to cover the second conductive layer 33 and the first protective conductive layer 35. The fourth conductive film 40 may also include a material similar to that of the third conductive film 30, such as ITO.

Next, referring to back to FIG. 9, a touch electrode Sx including a second electrode Sx2 and a first electrode Sx1, a connection line RL including a second line RL2 and a first line RL1, and a pad 300 including a second protective conductive layer 37, a first protective conductive layer 35, the second conductive layer 33, and the first conductive layer 31 are formed by etching the fourth conductive film 40 and the first conductive film 10 using the photolithography process, or the like. As such, by etching the fourth conductive film 40 and the first conductive film 10 simultaneously, the second electrode Sx2 and the first electrode Sx1 may have the same plane shape, and the second line RL2 and the first line RL1 may have the same line.

Referring back to FIG. 9, a passivation layer 180 is formed on the substrate 120. The passivation layer 180 may include silicon nitride (SiNx). Thereafter, an opening part 191 is formed by etching the passivation layer 180 on the pad 300, to expose a portion of the pad 300, The touch screen panel according to the present exemplary embodiment uses a total of three masks, including a first mask used during etching the second conductive film 20 and the third conductive film 30 simultaneously to form the second conductive layer 33 and the first protective conductive layer 35, a second mask used during etching the first conductive film 10 and the fourth conductive film 40 simultaneously to form the first conductive layer 31 and the second protective conductive layer 37, and a third mask used during etching the passivation layer 180 for forming the opening part 191 in order to expose the pad 300. Thereby, the touch screen panel according to the present exemplary embodiment may be formed by a simple manufacturing process using reduced number of masks compared to the related art.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A touch screen panel, comprising:
    a substrate;
    touch electrodes disposed on a touch area of the substrate and configured to sense a touch; and
    a connection line disposed on the touch area, the connection line comprising a first end connected a touch electrode of the touch electrodes and a second end connected to a pad, the pad comprising:
        a first conductive layer disposed on the substrate;
        a second conductive layer disposed on the first conductive layer; and
        a first protective conductive layer disposed on the second conductive layer,
    wherein the touch electrode comprises:
        the first conductive layer; and
        the first protective conductive layer.

2. The touch screen panel of claim 1, wherein the first protective conductive layer comprises a second protective conductive layer disposed on the first protective conductive layer.

3. The touch screen panel of claim 2, wherein the first protective conductive layer has substantially the same width as the second conductive layer.

4. The touch screen panel of claim 2, wherein the second protective conductive layer covers a top surface of the first protective conductive layer and a side surface of the second conductive layer.

5. The touch screen panel of claim 4, wherein the second protective conductive layer contacts a portion of a top surface of the first conductive layer not overlapping the second conductive layer.

6. The touch screen panel of claim 2, wherein the first and second protective conductive layers comprise conductive material.

7. The touch screen panel of claim 1, wherein the first conductive layer comprises a metal nanowire.

8. The touch screen panel of claim 7, wherein the first conductive layer further comprises a polymer resin film.

9. The touch screen panel of claim 1, wherein the second conductive layer comprises at least one of copper (Cu), titanium (Ti), aluminum (Al), molybdenum (MO), and transparent conductive oxide (TCO).

10. The touch screen panel of claim 1, further comprising a passivation layer disposed on the substrate, the passivation layer comprising an opening part exposing the pad.

11. The touch screen panel of claim 10, wherein the passivation layer comprises silicon nitride (SiNx).

12. The touch screen panel of claim 1, wherein the touch electrode further comprises:
    a first electrode disposed on the substrate, the first electrode comprising a metal nanowire; and
    a second electrode disposed on the first electrode, the second electrode comprising a transparent conductive material.

13. The touch screen panel of claim 12, wherein:
    the touch electrodes are disposed in rows and columns; and
    a first touch electrode of the touch electrodes is disposed in a first distance from the pad and comprises a first size; and
    a second touch electrode of the touch electrodes is disposed in a second distance from the pad less than the first distance and comprises a second size smaller than the first size.

* * * * *